W. H. EDSALL.
TRAVERSE RING.
APPLICATION FILED MAY 22, 1909.
944,720.
Patented Dec. 28, 1909.
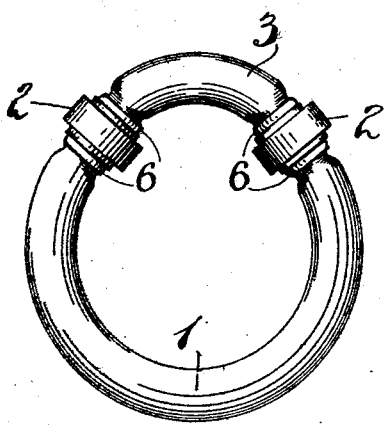
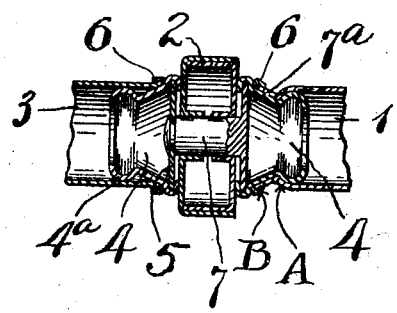
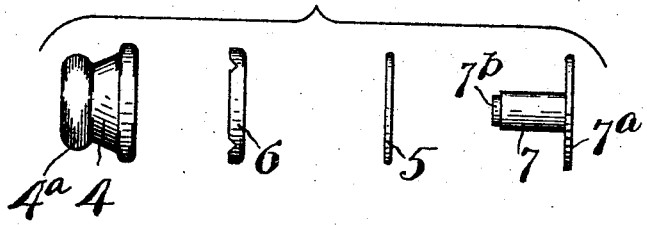
Witnesses:
Inventor
W. H. Edsall
By his Attorneys

UNITED STATES PATENT OFFICE.

WILLIAM HENRY EDSALL, OF WALLINGFORD, CONNECTICUT, ASSIGNOR TO H. L. JUDD COMPANY, OF WALLINGFORD, CONNECTICUT, A CORPORATION OF NEW YORK.

TRAVERSE-RING.

944,720.  Specification of Letters Patent. Patented Dec. 28, 1909.

Application filed May 22, 1909. Serial No. 497,622.

*To all whom it may concern:*

Be it known that I, WILLIAM H. EDSALL, a citizen of the United States, residing at Wallingford, county of New Haven, State of Connecticut, have invented certain new and useful Improvements in Traverse-Rings, of which the following is a full, clear, and exact description.

My invention relates to an improved anti-friction traverse ring for curtain poles and the like.

The object of the invention is to improve the construction whereby parts will be successfully made of light material and yet the finished article will possess great durability and strength.

In the accompanying drawing, Figure 1 is a plan view of my traverse ring complete. Fig. 2 is a relatively enlarged section through one of the anti-friction bearings, said section being coincident with the axis of the anti-friction device. Fig. 3 illustrates several detached details of construction.

1 is the main body of the ring, which is of tubular form and constructed from light sheet metal. This main body is C-shaped. At each end of this C-shaped main body is located an anti-friction roller 2—2. Between the anti-friction rollers is a tubular connecting piece 3, serving to complete the ring.

The invention relates particularly to the construction of the means for connecting the bodies 1 and 3 in such a manner as to afford a proper space and bearing for the anti-friction device 2—2.

The method and means of connecting the parts will best be understood by reference to Figs. 2 and 3. In these figures, 4 represents a hollow cone having an annular rounded or rib-like boss 4ª at its inner or smaller end. The diameter of the boss 4ª corresponds approximately to the interior of the tubular bodies 1 and 3. 5 is a washer, preferably made of iron or steel so as to possess maximum rigidity. 6 is a reinforcing annular clencher. 7 is a rivet preferably provided with an integral head 7ª at one end and with a reduced portion 7ᵇ at the other end. This rivet is likewise preferably made from one of the harder materials, whereas the balance of the parts (with the exception of the washer 5) may be made of light brass. It will be observed that the mere design of the cone 4 is such as to afford great strength, even though constructed of comparatively light brass.

Having thus described the main parts of the invention, the method of assembling will now be set forth. The rivet 7 is secured to one of the cones 4 by inserting the rivet head 7ª in the broader end of the cone, and then curling down the outer edge of the cone as shown at the right hand side of Fig. 2. A second cone 4 is then taken and the washer 5 is secured in its broader end, preferably by inturning the edge of the cone in the same manner as previously described. When these parts are secured together, namely, a cone 4 and the washer 5, the latter is slipped over the reduced end 7ᵇ of the rivet 7, and since the cone 4 is hollow, a suitable tool may be employed to upset or rivet the reduced end 7ᵇ of the part 7. Before this is done, the anti-friction device 2 should of course be placed upon the shank of the rivet 7. When two of these cones have thus been connected, the tube ends are applied. The reinforcing clencher 6 and one end of the tube 1 are then slipped over the smaller end of one cone and that part of the tube and reinforcing clencher surrounding said cone is clenched down as best seen at the right hand side of Fig. 2 so as to firmly unite the parts 4, 1 and 6. By this means a double clench is provided, one clench occurring at the point A, the second clench occurring at the point B. By reason of the shape and configuration of the parts, no solid reinforcing internal anvil is required to effectively produce this clenching effect. The function of the annular clencher 6 is not alone to reinforce the parts so as to permanently clench the edge of the tubular member 1, but it produces along that edge a reinforcement which prevents tearing the metal or spreading the tube. The advantage of this will be appreciated when it is understood that the tubes 1 and 3 are usually formed of light stock rolled into tubular form. By this improvement, there is no occasion to solder the seam in the tube, since the tendency to open the same is counteracted by the action of the annular clencher 6. It will be understood that the end of the tube section 3 may be secured to its corresponding cone 4 in the above manner.

In Fig. 2 I have shown one end of the section 3 upon its cone 4 with its annular clencher in place before the final clenching operation has occurred. It will be understood, however, that in the finished article the tube section 3 will be connected to its cone 4.

The rolled in edge of each cone furnishes a firm and durable bearing for the side wall of the anti-friction device 2, which in this instance is a light sheet metal roll. By this construction a definite spacing between the heads 4—4 may be uniformly obtained.

Obviously the invention is not limited to the particular form of anti-friction device shown. Any suitable type of wheel or roller may be employed. While I have shown a roller constructed of sheet metal, obviously solid metal, or any other material, adaptable for the purpose may be substituted.

What I claim is:

1. In a traverse ring, a shaft bearing for an anti-friction roller, an integral head at one end and a separate washer-like head at the opposite end arranged to be rigidly secured thereto, said washer-like head corresponding substantially in size and shape to the integral head, a hollow cone-like body for said shaft heads and rigidly clenched thereon, two tubular ring sections rigidly connected with said cone-heads, said tubular ring sections surrounding the smaller ends of said cone-heads, each of said heads being annularly grooved, the metal of said tubular sections being forced into grooves and a clencher ring mounted upon the outer side of each cone and clenched down upon the extreme end of the metal at the end of its respective tubular ring section, and means for securing together the two other ends of said ring sections.

2. In a traverse ring, a solid anti-friction bearing shaft, a head at each end, both of said heads corresponding substantially in size and being rigidly spaced apart, one of said heads being formed separately from said shaft, an anti-friction bearing on said shaft, a hollow cone-head rigidly secured to each head of said shaft, said cone-heads being secured thereto at their broader ends, two oppositely arranged tubular ring sections making direct connection with the external walls of said cone-heads, each cone head having an annular groove, the metal near each end of said tubular ring sections being forced into said annular grooves and a reinforcing clencher ring closed down upon the extreme end of each tubular body, each of said clencher rings being mounted partly upon the external wall of its respective cone-head and partly upon the external surface of its respective tube end when the parts are assembled and means for securing together the two other ends of said ring sections.

3. A curtain ring, a shaft, an integral head at one end, the opposite end of said shaft being reduced in diameter, a washer mounted upon said reduced end and riveted thereto, a hollow cone-head mounted on the integral head of said shaft, and a second hollow cone-head mounted upon said washer, an annular groove in each of said cone-heads, two tubular ring sections secured to said cone-heads, a portion of the metal of each ring section being forced into the annular recessed portion of each head and an external reinforcing clenching ring mounted at the extreme end of each of said sections, a portion of said clenching ring being clenched down upon the external surface of the tubular ring sections and extending over the extreme edge of each of said ring sections to reinforce the same against tearing and to prevent the ring section from opening and means for securing together the two other ends of said ring sections.

4. In a traverse ring, a shaft bearing for an antifriction roller, an integral head at one end and a separate washer-like head at the opposite end arranged to be rigidly secured thereto, a hollow cone-like body for each of said shaft heads and rigidly secured thereto, two tubular ring ends rigidly connected with said cone heads, said tubular ring ends surrounding the smaller ends of said cone heads, each of said heads being annularly grooved, the metal of said tubular ends being forced into said grooves, and a clencher ring mounted upon the outer side of each cone head and clenched down upon the extreme end of the metal at the end of its respective tube end.

WILLIAM HENRY EDSALL.

Witnesses:
 GILBERT MARCH,
 A. V. SANCHEZ.